(12) United States Patent
Satou

(10) Patent No.: US 7,895,828 B2
(45) Date of Patent: Mar. 1, 2011

(54) LIQUID REDUCING AGENT INJECTION NOZZLE HAVING NOVEL STRUCTURE

(75) Inventor: Hirokazu Satou, Ageo (JP)

(73) Assignee: Nissan Diessel Motor Co., Ltd., Ageo (JP)

( * ) Notice: Subject to any disclaimer, the term of this patent is extended or adjusted under 35 U.S.C. 154(b) by 0 days.

(21) Appl. No.: 11/785,989

(22) Filed: Apr. 23, 2007

(65) Prior Publication Data
US 2007/0193255 A1 Aug. 23, 2007

Related U.S. Application Data

(63) Continuation of application No. PCT/JP2005/017286, filed on Sep. 20, 2005.

(30) Foreign Application Priority Data

Oct. 29, 2004 (JP) ............................. 2004-315634

(51) Int. Cl.
F01N 3/00 (2006.01)
(52) U.S. Cl. .............................. 60/286; 60/295; 60/301; 60/303
(58) Field of Classification Search ................... 60/286, 60/295, 301, 303
See application file for complete search history.

(56) References Cited

U.S. PATENT DOCUMENTS

| | | | | |
|---|---|---|---|---|
| 5,606,856 | A * | 3/1997 | Linder et al. ................... | 60/286 |
| 5,992,141 | A * | 11/1999 | Berriman et al. ............... | 60/274 |
| 6,041,594 | A * | 3/2000 | Brenner et al. ................. | 60/309 |
| 6,382,600 | B1 | 5/2002 | Mahr | |
| 6,553,755 | B2 * | 4/2003 | Hofmann et al. ............... | 60/282 |
| 2005/0022515 | A1 * | 2/2005 | Stiermann ...................... | 60/286 |

FOREIGN PATENT DOCUMENTS

| | | |
|---|---|---|
| DE | 19946901 A1 | 4/2001 |
| JP | 2000-027627 A | 1/2000 |
| JP | 2000-510215 A | 8/2000 |
| JP | 2001-523165 A | 11/2001 |
| JP | 2002-531743 A | 9/2002 |
| JP | 2003-510175 A | 3/2003 |
| WO | WO 97/43528 A1 | 11/1997 |
| WO | WO 99/30811 A1 | 6/1999 |
| WO | 0009869 A1 | 2/2000 |
| WO | WO 01/23074 A1 | 4/2001 |

OTHER PUBLICATIONS

Extended European Search Report (EESR) for related European Application No. 05785678.3 (dated Jun. 9, 2010).

* cited by examiner

*Primary Examiner*—Thomas E Denion
*Assistant Examiner*—Diem Tran
(74) *Attorney, Agent, or Firm*—Baker & Hostetler LLP

(57) ABSTRACT

The present invention relates to a structure of a liquid reducing agent injection nozzle in an exhaust emission purifying system arranged to inject and supply a liquid reducing agent into an exhaust flow passage so as to reduce and purify NOx in exhaust gas. A nozzle tip end portion of the liquid reducing agent injection nozzle which protrudes from a wall surface of an exhaust flow passage into the passage, is bent obliquely with respect to an exhaust flow direction, or nozzle holes of the nozzle tip end portion are formed so as to tilt in the exhaust flow direction with respect to a radial direction perpendicular to a center axis of the nozzle tip end portion or are unevenly distributed in the circumferential direction of the nozzle tip end portion.

10 Claims, 14 Drawing Sheets

(PRIOR ART)

LIQUID REDUCING AGENT INJECTION NOZZLE HAVING NOVEL STRUCTURE

This application is a continuation of PCT/JP2005/017286, filed on Sep. 20, 2005.

BACKGROUND OF THE INVENTION

1. Field of the Invention

The present invention relates to a liquid reducing agent injection nozzle which is used in an exhaust emission purifying system for reducing NOx in exhaust gas using a liquid reducing agent, and particularly to a liquid reducing agent injection nozzle having a novel structure, in which accumulation of a reducing agent component of the liquid reducing agent onto a wall surface of the exhaust passage upon being injected in an exhaust flow passage, can be appreciably reduced.

2. Description of the Related Art

As conventional exhaust emission purifying systems which eliminate NOx contained in engine exhaust gas, an exhaust emission purifying device, which injects and supplies a liquid reducing agent to an exhaust gas moving in a region prevailing in the upstream of a reduction catalyst disposed on an engine exhaust system to cause catalytic reaction between NOx and the reducing agent in the exhaust gas so as to purify NOx into harmless components, is proposed (for example, see Japanese Patent Publication No. 2000-27627).

In this exhaust emission purifying device, as shown in FIG. 13, a liquid reducing agent injection nozzle 100 is protruded from the wall surface of an exhaust flow passage 102 toward an adjoining position with respect to a center of the exhaust passage and is secured on the wall of the exhaust flow passage so that a nozzle tip end portion 100a which is bent is arranged along a flow direction of the exhaust gas. Urea aqueous solution, for example, as the liquid reducing agent is spouted and supplied toward the exhaust passage wall surface from a number of nozzle holes 101 which are formed around the nozzle tip end portion 100a as shown in FIG. 14, and each of which is formed in a radial direction perpendicular to a center axis of the nozzle tip end portion 100a. As a result, the spouted liquid reducing agent is diffused and mixed with the exhaust gas by the flow of the exhaust gas, and efficiency of NOx conversion using the reduction catalyst is increased.

For the liquid reducing agent injection nozzle protruded into the exhaust passage, it is desirable that the nozzle tip end portion is disposed on an approximately center of the exhaust passage in order that the liquid reducing agent is distributed substantially uniformly in the exhaust gas. Due to a cantilever supporting structure, however, when the liquid reducing agent injection nozzle is used in particularly large-size cars, the injection nozzle might be damaged due to a vibration of vehicle body or the like, or heat capacity might become large and then a reducing agent component of the liquid reducing agent might be accumulated onto the inner wall of the injection nozzle due to exhaust heat, thereby possibly blocking up the nozzle. For this reason, at present, the nozzle tip end portion is arranged to protrude from the wall surface to a position which is approximately ⅓ of a distance between the wall surface of the exhaust passage and the passage center. As to conventional liquid reducing agent nozzles, as shown in FIG. 13, the nozzle tip end portion 100a is bent at an approximately right angle, and as shown in FIG. 14, each of the nozzle holes 101 is formed in a radial direction of the nozzle tip end portion 100a, namely, in a direction toward the passage wall surface. Since an exhaust flow rate near the passage wall is slower than that of the passage center, the diffusion and mixing of the liquid reducing agent are not sufficient, and the reducing agent component of the liquid reducing agent might be easily adhere to a wall surface on a side on which the nozzle is attached. For this reason, when a urea aqueous solution is used, for example, water is evaporated from the urea aqueous solution adhered to the wall surface of the exhaust passage due to the exhaust heat, and as shown in FIG. 13, urea is deposited and gradually accumulated on the exhaust passage wall surface near the nozzle attaching portion.

SUMMARY OF THE INVENTION

Therefore, in view of the above conventional problems, the present invention has an object to provide a liquid reducing agent injection nozzle having a novel structure and capable of permitting reduction in accumulation of a reducing agent component of the liquid reducing agent on a wall surface of an exhaust flow passage with certainty.

Therefore, in accordance with a first aspect of the present invention, a liquid reducing agent injection nozzle having a novel structure is provided with such a configuration that the liquid reducing agent injection nozzle is: attached to a wall surface of an exhaust flow passage of an exhaust gas located on an upstream of a reduction catalyst in the exhaust flow passage, the reduction catalyst being operative to reduce and purify a nitrogen oxide using a liquid reducing agent and disposed in the exhaust flow passage; arranged to protrude from the wall surface towards a passage center to a position close to but before the passage center; and configured to permit the liquid reducing agent to be spouted and supplied from a number of nozzle holes formed therein around a nozzle tip end portion thereof, the nozzle tip end portion being bent to have a posture thereof which is directed substantially toward a direction of flow of the exhaust gas, wherein the bent nozzle tip end portion of the liquid reducing agent injection nozzle is arranged to have a central axis thereof directed towards the passage center and defining an angle of bend which is oblique to the exhaust flow direction.

In the described first invention, the nozzle holes of the nozzle tip end portion may be formed to be tilted in the exhaust flow direction with respect to a radial direction perpendicular to the center axis of the nozzle tip end portion.

Further, in the described first invention, the nozzle holes of the nozzle tip end portion may be unevenly distributed in a position at which the liquid reducing agent is spouted to an area excluding a predetermined range, the predetermined range including a nozzle attaching portion of the wall surface on the nozzle attaching side as a substantially center portion thereof.

In accordance with a second aspect of the present invention, a liquid reducing agent injection nozzle having a novel structure is provided with such a configuration that the liquid reducing agent injection nozzle is: attached to a wall surface of an exhaust flow passage of an exhaust gas located on an upstream of a reduction catalyst in the exhaust flow passage, the reduction catalyst being operative to reduce and purify a nitrogen oxide using a liquid reducing agent and disposed in the exhaust flow passage; arranged to protrude from the wall surface towards a passage center to a position close to but before the passage center; and configured to permit the liquid reducing agent to be spouted and supplied from a number of nozzle holes formed therein around a nozzle tip end portion thereof, the nozzle tip end portion being bent to have a posture thereof which is directed substantially toward a direction of flow of the exhaust gas, wherein the nozzle holes of the nozzle tip end portion are formed to be tilted in the exhaust flow direction with respect to a radial direction perpendicular to the central axis of the nozzle tip end portion.

In the described second invention, the nozzle holes of the nozzle tip end portion may be unevenly distributed in a position at which the liquid reducing agent is spouted to an area excluding a predetermined range, the predetermined range including a nozzle attaching portion of the wall surface on the nozzle attaching side as a substantially center portion thereof.

In accordance with a third aspect of the present invention, a liquid reducing agent injection nozzle having a novel structure is provided with such a configuration that the liquid reducing agent injection nozzle is: attached to a wall surface of an exhaust flow passage of an exhaust gas located on an upstream of a reduction catalyst in the exhaust flow passage, the reduction catalyst being operative to reduce and purify a nitrogen oxide using a liquid reducing agent and disposed in the exhaust flow passage; arranged to protrude from the wall surface towards a passage center to a position close to but before the passage center; and configured to permit the liquid reducing agent to be spouted and supplied from a number of nozzle holes formed therein around a nozzle tip end portion thereof, the nozzle tip end portion being bent to have a posture thereof which is directed substantially toward a direction of flow of the exhaust gas, wherein the nozzle holes of the nozzle tip end portion are unevenly distributed in a position at which the liquid reducing agent is spouted to an area excluding a predetermined range, the predetermined range including a nozzle attaching portion of the wall surface on the nozzle attaching side as a substantially center portion thereof.

In the first through third aspects of the present invention, the nozzle holes of the nozzle tip end portion are unevenly distributed in a position at which the liquid reducing agent is spouted to an area excluding a predetermined range, the predetermined range including a nozzle attaching portion of the wall surface on the nozzle attaching side as a substantially center portion thereof. Then, in a preferred embodiment, the nozzle holes may be formed to be aligned on each of a plurality of lines which are arranged side by side in an axial direction of the nozzle tip end portion, and positions of the nozzle holes on the adjacent lines are shifted from each other in a circumferential direction.

The liquid reducing agent injection nozzle according to the first through third aspects of the present invention is applied to a liquid reducing agent injection nozzle of a muffling device with an exhaust purifying function, the muffling device comprising a constitution such that an exhaust flow passage provided in the muffling is provided with a returning portion, the liquid reducing agent injection nozzle is arranged in the exhaust flow passage on an upstream side of the returning portion, and the reduction catalyst is arranged in the exhaust flow passage on a downstream side of the returning portion.

According to the present invention, the amount of the liquid reducing agent adhered to a portion of the wall surface of the exhaust flow passage which is located close to the position where the liquid reducing agent injection nozzle is attached to the wall surface of the exhaust flow passage can be appreciably reduced than the conventional amount of adherence of the reducing agent, so that the accumulation of a reducing agent component of the liquid reducing agent onto the wall surface of the exhaust flow passage near the nozzle attaching portion can be suppressed.

Further, since the nozzle holes of the nozzle tip end portion are formed to be tilted in the exhaust flow direction, or since the nozzle holes are unevenly distributed around the nozzle tip end portion, or since the nozzle holes are formed to be aligned on respective of the plurality of lines that are arranged side by side in an axial direction of the nozzle tip end portion and the positions of the nozzle holes on the adjacent lines are shifted from each other in a circumferential direction, as a result, the amount of the liquid reducing agent adhered to the wall surface of the exhaust flow passage close to the liquid reducing agent injection nozzle attaching portion can be further reduced, and the accumulation of the reducing agent component of the liquid reducing agent onto the wall surface of the exhaust flow passage located close to the nozzle attaching portion can be further suppressed.

DESCRIPTION OF THE PREFERRED EMBODIMENTS

Embodiments of the present invention will be explained in detail below with reference to the accompanying drawings.

Figure 1:
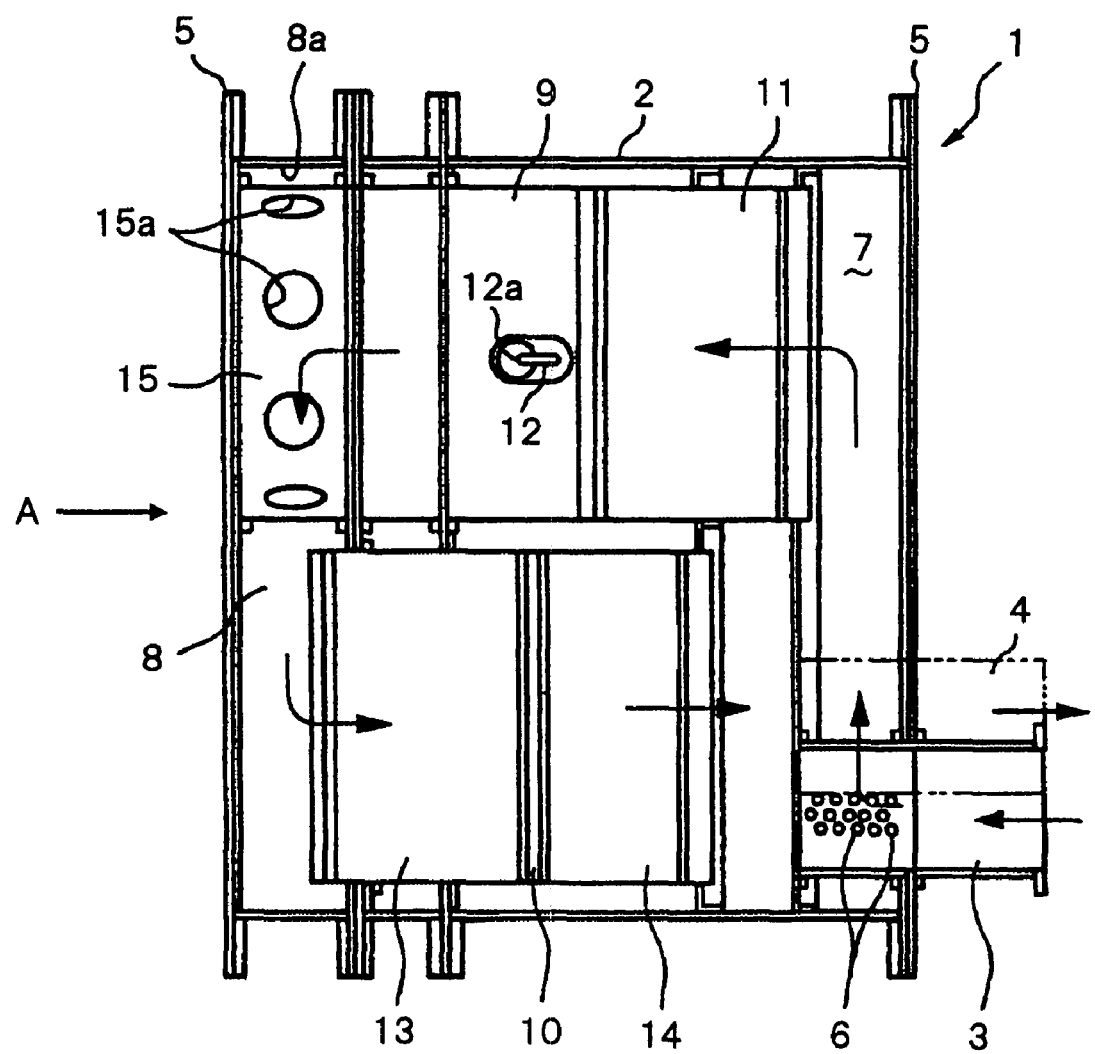
FIG. 1 is a diagrammatic view illustrating an internal structure of a muffling device with an exhaust purifying function to which a liquid reducing agent injection nozzle of the present invention is applied.

FIG. 1 is a diagrammatic view illustrating an internal structure of a muffling device with an exhaust purifying function to which a liquid reducing agent injection nozzle structure according to one embodiment of the first invention is applied.

In FIG. 1, a muffling device 1 with an exhaust purifying function is provided with an exhaust influx portion 3 on a right side of a case 2 in the drawing figure, and an exhaust emission portion 4 (shown by a two-dotted broken line in the drawing figure) on a front side of the exhaust influx portion 3 in the drawing figure. A mounting flange portion 5 arranged capable of making fixation to a vehicle is provided to an outer periphery of the case 2 at a suitable portion. An expansion chamber 7, a returning portion 8, an upstream side exhaust flow passage 9 and a downstream side exhaust flow passage 10 are formed in the case 2. The expansion chamber 7 is connected to the exhaust influx portion 3 via a number of holes 6 formed on the exhaust influx portion 3. The returning portion 8 is configured to turn back the exhaust flow on the side surface opposite to the expansion chamber 7. The upstream side exhaust flow passage 9 is arranged to connect the expansion chamber 7 and the returning portion 8. The downstream side exhaust flow passage 10 is arranged to connect the returning portion 8 and the exhaust emission portion 4.

Figure 3:
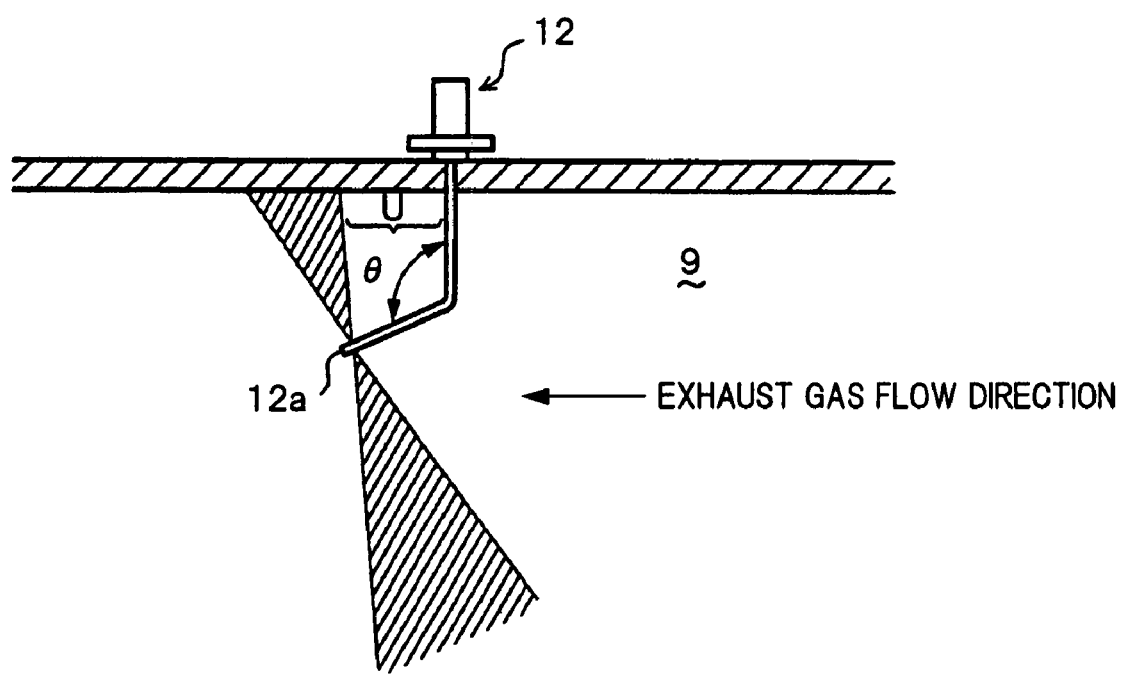
FIG. 3 is a diagrammatic view illustrating an attaching state on a passage, of the liquid reducing agent injection nozzle according to one embodiment of the first invention.

The upstream side exhaust flow passage 9 is provided with an oxidation catalyst 11 which oxidizes NO in the exhaust gas into $NO_2$, and a liquid reducing agent injection nozzle 12 having a structure shown in FIG. 3 configured to inject and supply a liquid reducing agent, such as a urea aqueous solution, to a downstream side of the oxidation catalyst 11. The liquid reducing agent injection nozzle 12 according to the present embodiment will be explained later in detail.

The downstream side exhaust flow passage 10 is provided with a NOx reduction catalyst 13 which reduces and purifies NOx using the liquid reducing agent, and on a downstream side of the NOx reduction catalyst 13, a reducing agent oxidation catalyst 14 which oxidizes and purifies the liquid reducing agent having passed through the NOx reduction catalyst 13.

A ring member 15, which generates vertical swirling motion in the exhaust flow at the returning portion 8 so as to diffuse the liquid reducing agent, is disposed on the returning portion 8 at a portion where the returning portion 8 is communicated with the upstream side exhaust flow passage 9. To the ring member 15, a plurality of holes 15a are substantially equiangularly arranged along a circumferential direction. The ring member 15 guides the exhaust gas, which flows into the returning portion 8 from the upstream side exhaust flow passage 9 via the holes 15a towards a returning portion wall surface 8a arranged substantially parallel with an exhaust flow direction.

Figure 2:
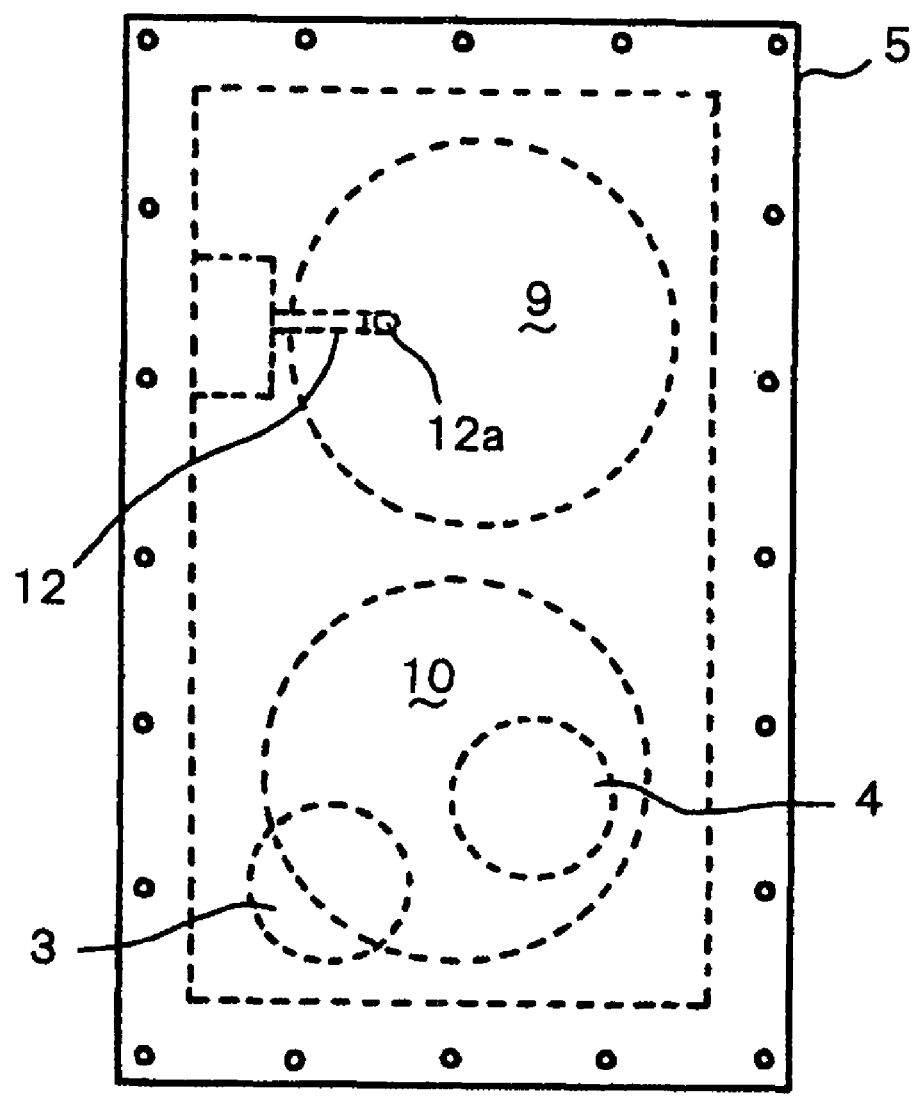
FIG. 2 is a diagrammatic view illustrating a positional relationship of an exhaust influx portion, an exhaust emission portion, a injection nozzle, an upstream side exhaust flow passage and a downstream side exhaust flow passage when viewed from a direction of an arrow A indicated in FIG. 1.

FIG. 2 illustrate a positional relationship of the exhaust influx portion 3, the exhaust emission portion 4, the liquid reducing agent injection nozzle 12, the upstream side exhaust flow passage 9 and the downstream side exhaust flow passage 10 when viewed from a direction of an arrow A indicated in FIG. 1.

An exhaust purifying operation of the muffling device 1 with the exhaust purifying function will be briefly explained hereinbelow.

As shown with arrows of FIG. 1, the exhaust gas flowing from the exhaust influx portion 3 flows into the expansion chamber 7 via the holes 6, and flows sequentially to the upstream side exhaust flow passage 9, the returning portion 8 and the downstream side exhaust flow passage 10, and then the exhaust gas is emitted from the exhaust emission portion 4. At this time, after NO in the exhaust gas is oxidized into $NO_2$ with the oxidation catalyst 11 in the upstream side exhaust flow passage 9, the liquid reducing agent is injected and supplied from the liquid reducing agent injection nozzle 12 into the exhaust gas. The exhaust gas including the liquid reducing agent passes through the holes 15a of the ring member 15 at the returning portion 8, and the liquid reducing agent is effectively diffused and mixed with the exhaust gas due to the function of the ring member 15, and then the resulted mixture of the exhaust gas and the liquid reducing agent flows into the NOx reduction catalyst 13 of the downstream side exhaust flow passage 10. NOx in the exhaust gas is reduced and purified by the NOx reduction catalyst 13 using the liquid reducing agent, and the residual liquid reducing agent is oxidized and purified by the reducing agent oxidation catalyst 14, and then emitted from the exhaust emission portion 4.

In the following description, the liquid reducing agent injection nozzle 12 according to this embodiment shown in FIG. 3 will be explained in detail.

Figure 14:
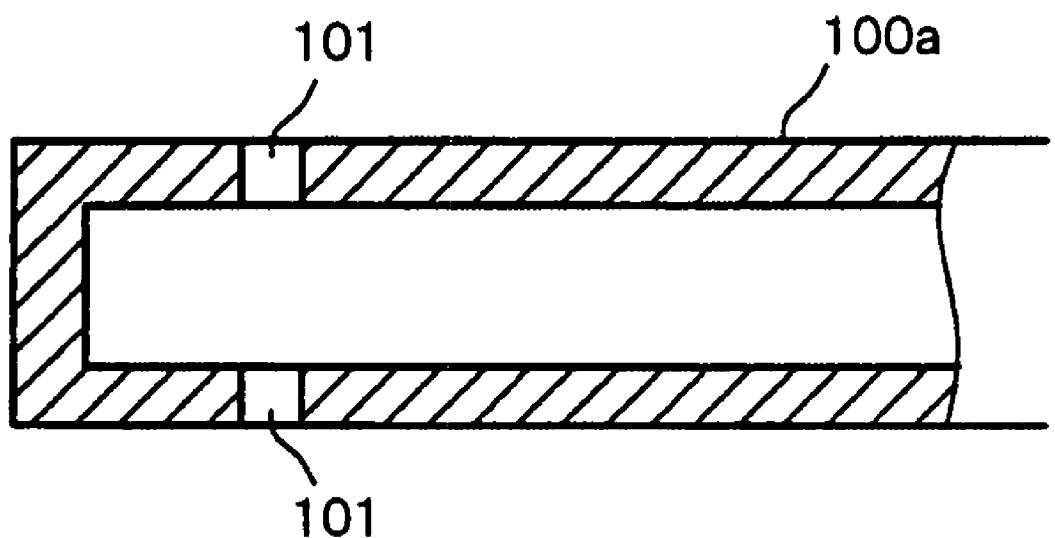
FIG. 14 is a cross-sectional view illustrating a nozzle tip end portion of the conventional liquid reducing agent injection nozzle.

As shown in FIG. 3, the liquid reducing agent injection nozzle 12 according to this embodiment is attached to the wall surface of the passage 9 so that the injection nozzle 12 is protruded towards a passage center from the wall surface of the upstream side exhaust flow passage 9 and so that a nozzle tip end portion 12a is directed along the exhaust flow direction in a position close to but before the passage center position, as similar to the conventional one. Further to the conventional one, according to the present embodiment, the nozzle tip end portion 12a is bent obliquely with respect to the exhaust flow direction toward the passage center as shown in the figure. A bending angle θ is approximately 120°, for example. A number of nozzle holes (for example, eight) formed around the nozzle tip end portion 12a are substantially equiangularly formed along the circumference of the nozzle tip end portion 12a similarly to ones shown in FIG. 14, and they face a radial direction perpendicular to a center axis of the nozzle tip end portion 12a.

In the liquid reducing agent injection nozzle 12 having such an aforementioned structure, the injecting direction of the liquid reducing agent to be injected from the nozzle holes of the nozzle tip end portion 12a is shifted farther away from a nozzle attaching portion than the conventional ones, in the passage wall surface side at which the liquid reducing agent injection nozzle 12 is attached. Therefore, the amount of the liquid reducing agent to be adhered to a passage wall surface region U near the nozzle attaching portion shown in FIG. 3 can be reduced greatly. As a result, when a urea aqueous solution, for example, is used as the liquid reducing agent, the accumulation of urea as the reducing agent component, occurring on the passage wall surface region U can be suppressed.

In the following description, the liquid reducing agent injection nozzle according to one embodiment of the second invention will be explained.

Figure 4:
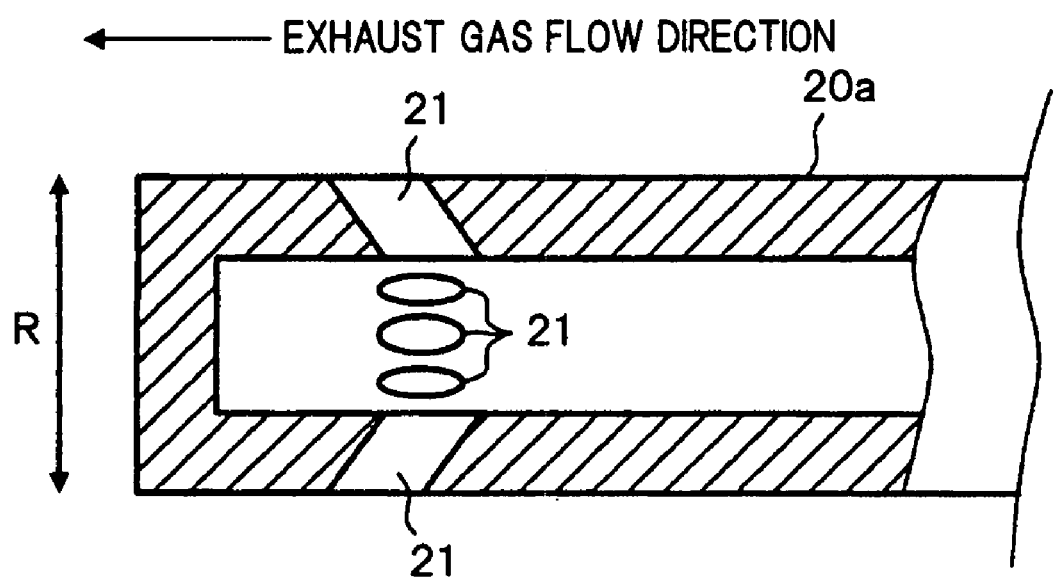
FIG. 4 is an enlarged cross-sectional view illustrating a nozzle tip end portion of the liquid reducing agent injection nozzle according to one embodiment of the second invention.

FIG. 4 is an enlarged diagrammatic view of a main portion of a liquid reducing agent injection nozzle 20 according to this embodiment.

Figure 13:
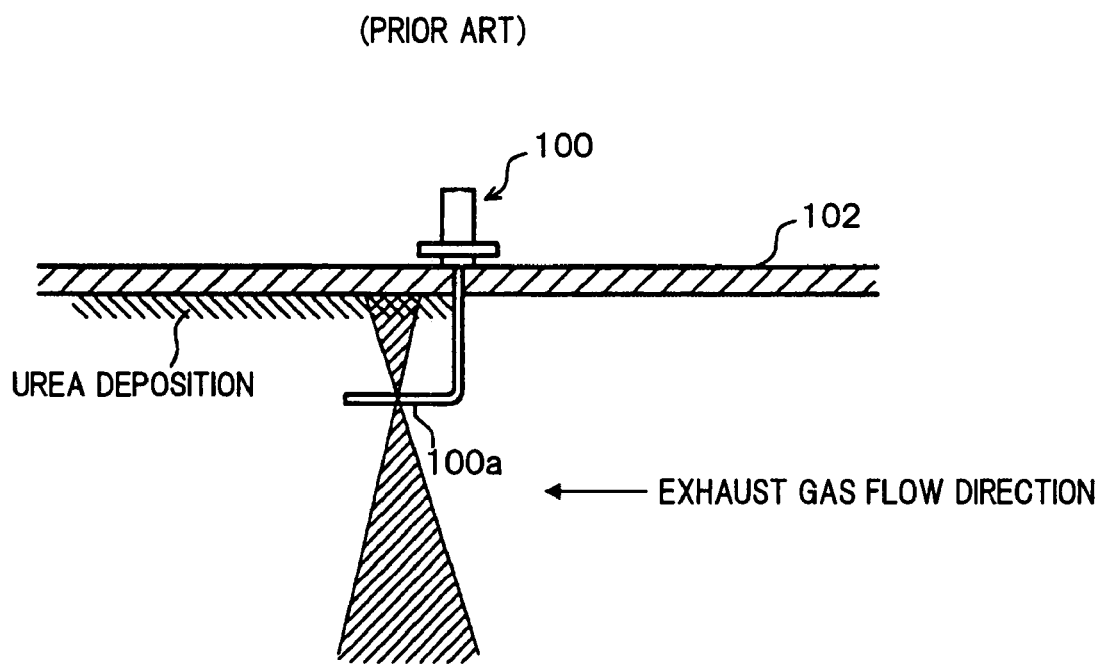
FIG. 13 is a diagram illustrating a attaching state on a passage, of a conventional liquid reducing agent injection nozzle.

In FIG. 4, in the liquid reducing agent injection nozzle 20 according to this embodiment, similarly to the conventional one as shown in FIG. 13, nozzle holes 21 provided around a nozzle tip end portion 20a which is bent approximately perpendicularly, namely, along the exhaust flow direction, are formed so as to be tilted in the exhaust flow direction with respect to the radial direction (direction of an arrow R indicated in FIG. 4) perpendicular to the center axis of the nozzle tip end portion 20a. The tilt angle is approximately 30°, for example.

Figure 5:
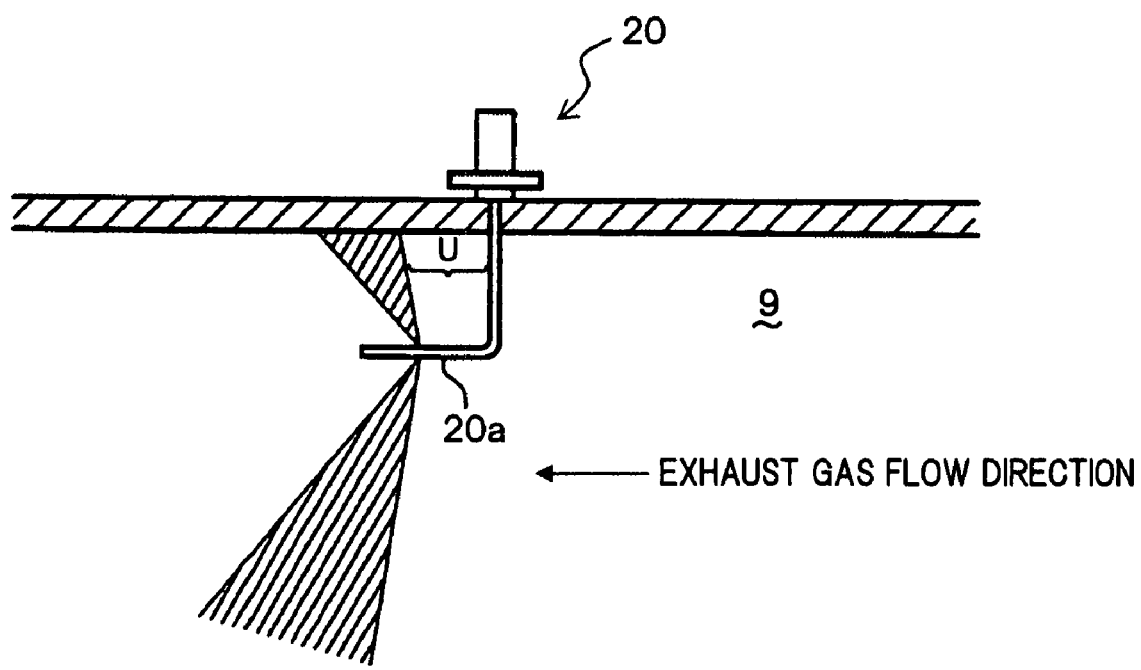
FIG. 5 is a diagrammatic view illustrating the attaching state on the passage according to the embodiment shown in FIG. 4.

In the liquid reducing agent injection nozzle 20 having such an aforementioned structure, similarly to the nozzle structure of FIG. 3, as shown in FIG. 5, the injecting direction of the liquid reducing agent to be injected from the nozzle holes 21 of the nozzle tip end portion 20a is shifted farther away from the nozzle attaching portion than the conventional one, in the passage wall surface side at which the liquid reducing agent injection nozzle 20 is attached. For this reason, the amount of the liquid reducing agent to be adhered to the passage wall surface region U near the nozzle attaching portion of FIG. 5 can be reduced greatly, and the accumulation of urea or the like, occurring on the passage wall surface region U can be suppressed.

In the following description, the liquid reducing agent injection nozzle according to a first embodiment of the third invention will be explained.

Figure 6:
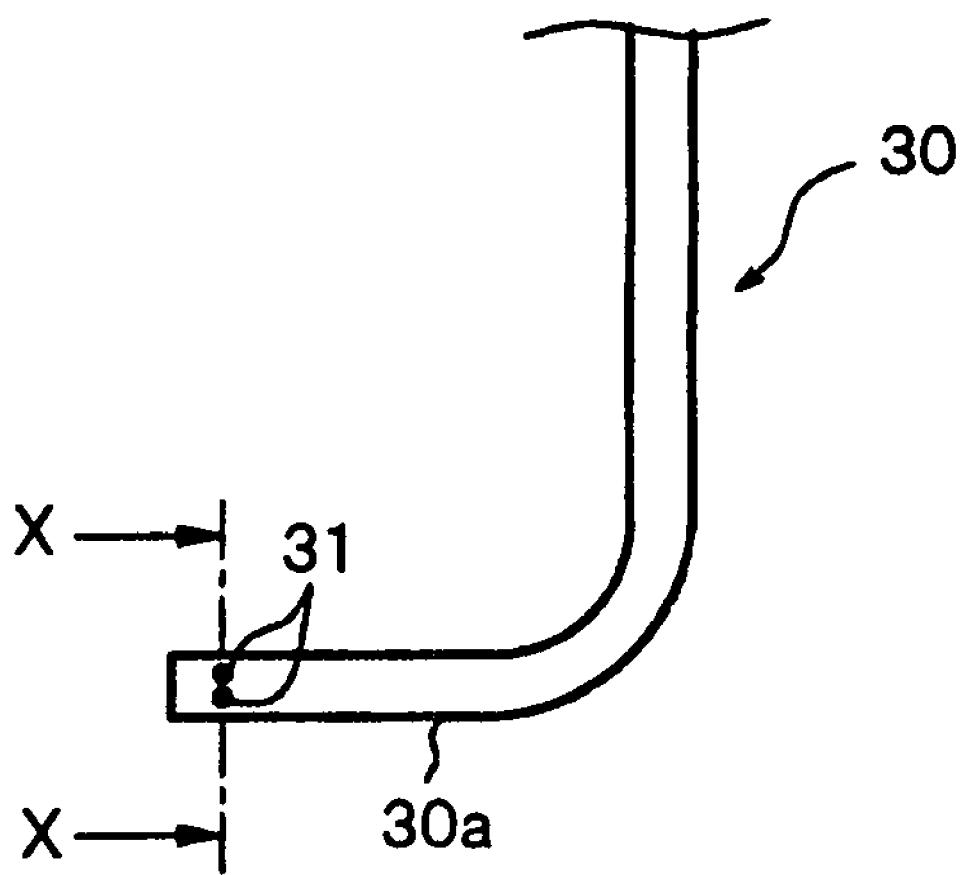
FIG. 6 is a diagrammatic view illustrating a nozzle tip end portion of the liquid reducing agent injection nozzle according to a first embodiment of the third invention.
Figure 7:
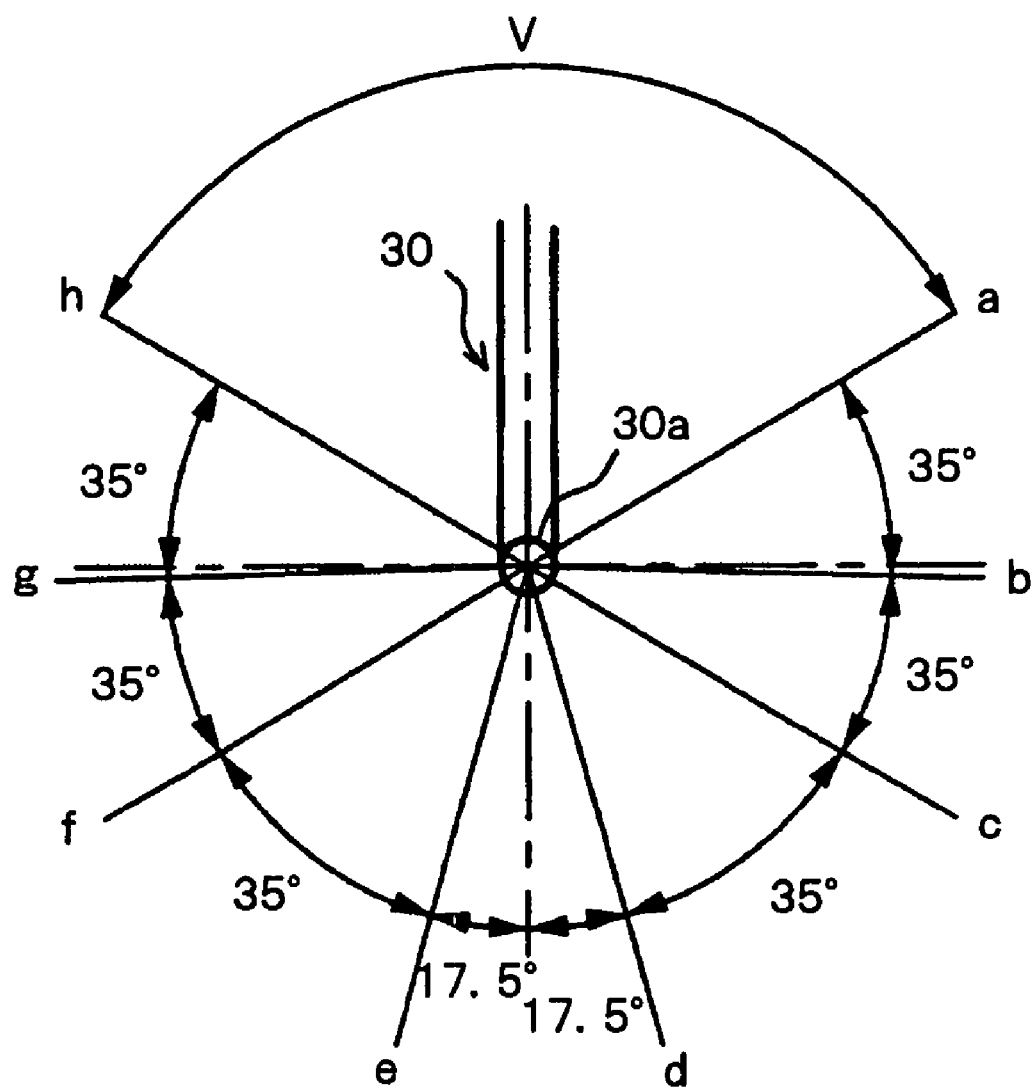
FIG. 7 is a cross-sectional view in the direction of X-X in FIG. 6.

In a liquid reducing agent injection nozzle 30 according to this embodiment, a number of, for example, eight, nozzle holes 31 to be provided around a nozzle tip end portion 30a which is bent substantially perpendicularly along the exhaust flow direction as shown in FIG. 6, similarly to the conventional one, are unevenly distributed in the circumferential direction of the nozzle tip end portion 30a, as shown in FIG. 7 illustrating the cross-sectional view in the direction of X-X in FIG. 6, so that the liquid reducing agent is injected to an area excluding a predetermined range V including the nozzle attaching portion on the wall surface on the nozzle attaching side as a substantially center position thereof. In FIG. 7, symbols a through h designate positions where the nozzle holes 31 are formed, and numerical values indicate spaces or intervals (angles) between the nozzle holes 31.

Figure 8:
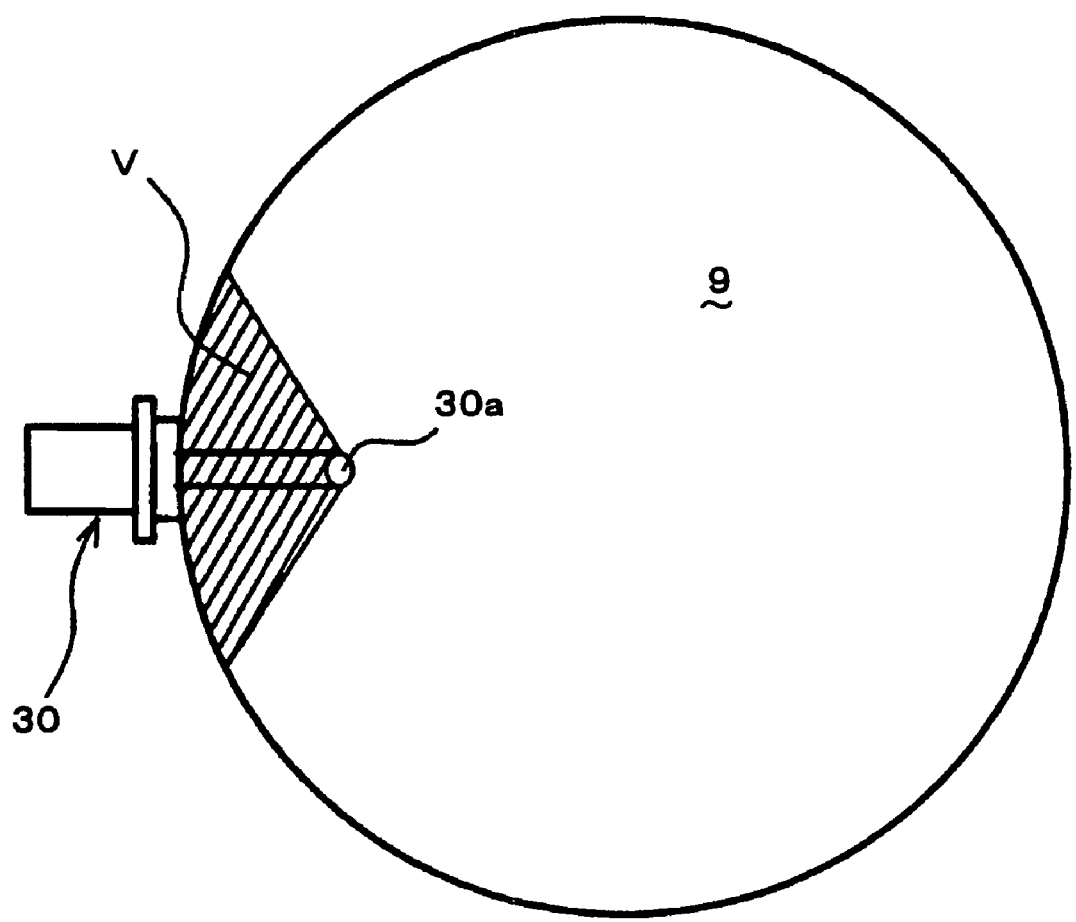
FIG. 8 is an explanatory diagrammatic view illustrating an adhesion suppressing region in the embodiment shown in FIG. 6.

In the liquid reducing agent injection nozzle 30 having such an aforementioned structure, when viewed from a cross-sectional direction of the upstream side exhaust flow passage 9, as shown in FIG. 8, the amount of the liquid reducing agent to be adhered to a predetermined range V indicated by a shaded area in FIG. 8 at which the nozzle attaching portion on the wall surface on the nozzle attaching side is included as a substantially center position thereof can be greatly reduced, and the accumulation of urea or the like on the predetermined range V can be suppressed.

In the following description, the liquid reducing agent injection nozzle according to a second embodiment of the third invention will be explained.

Figure 9:
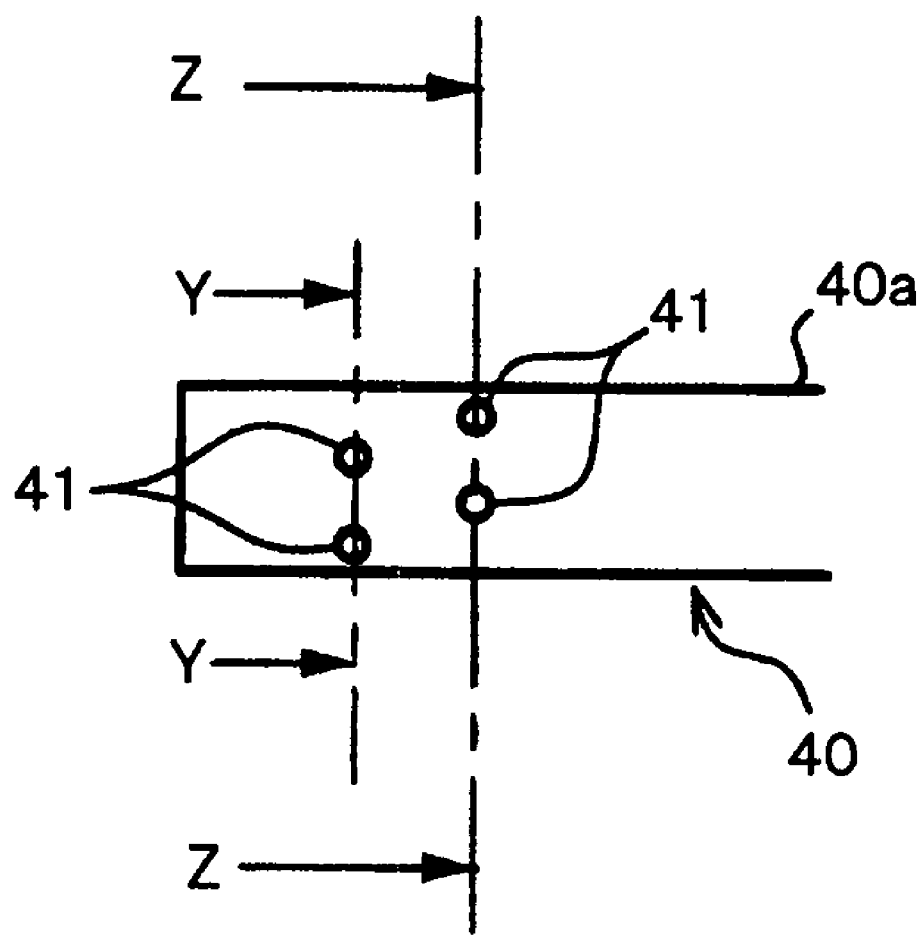
FIG. 9 is a diagrammatic view illustrating the nozzle tip end portion of the liquid reducing agent injection nozzle according to a second embodiment of the third invention.
Figure 10:
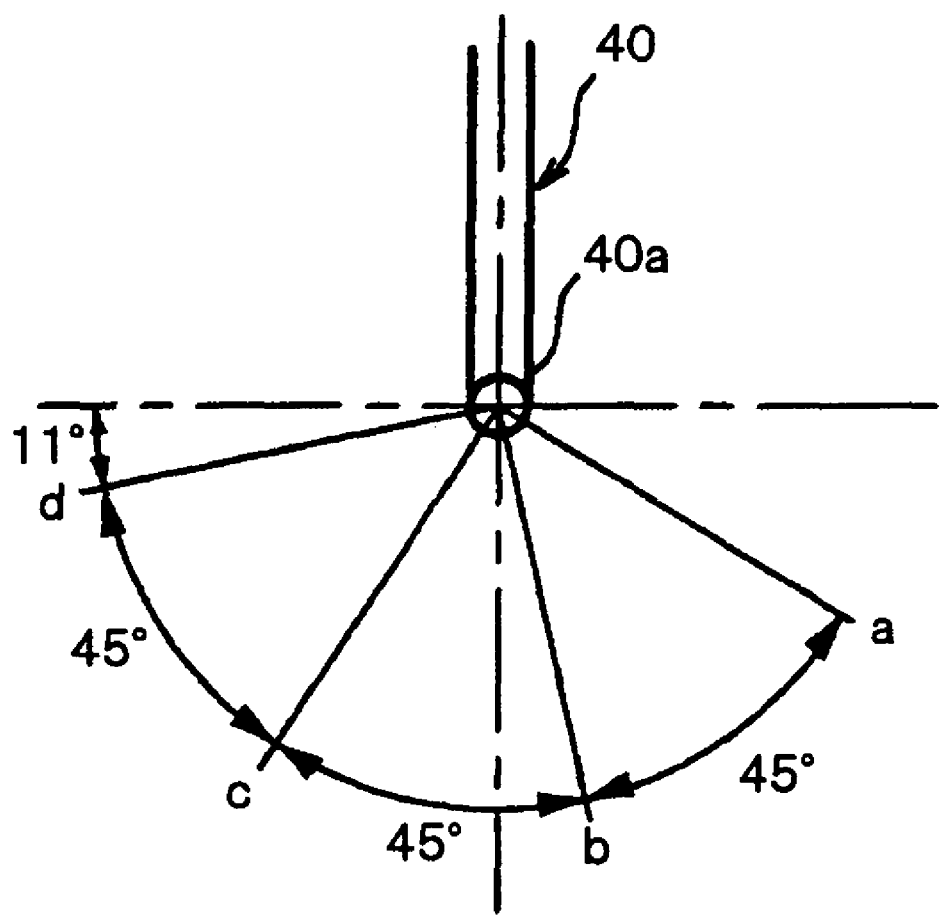
FIG. 10 is a cross-sectional view in the direction of Y-Y in FIG. 9.
Figure 11:
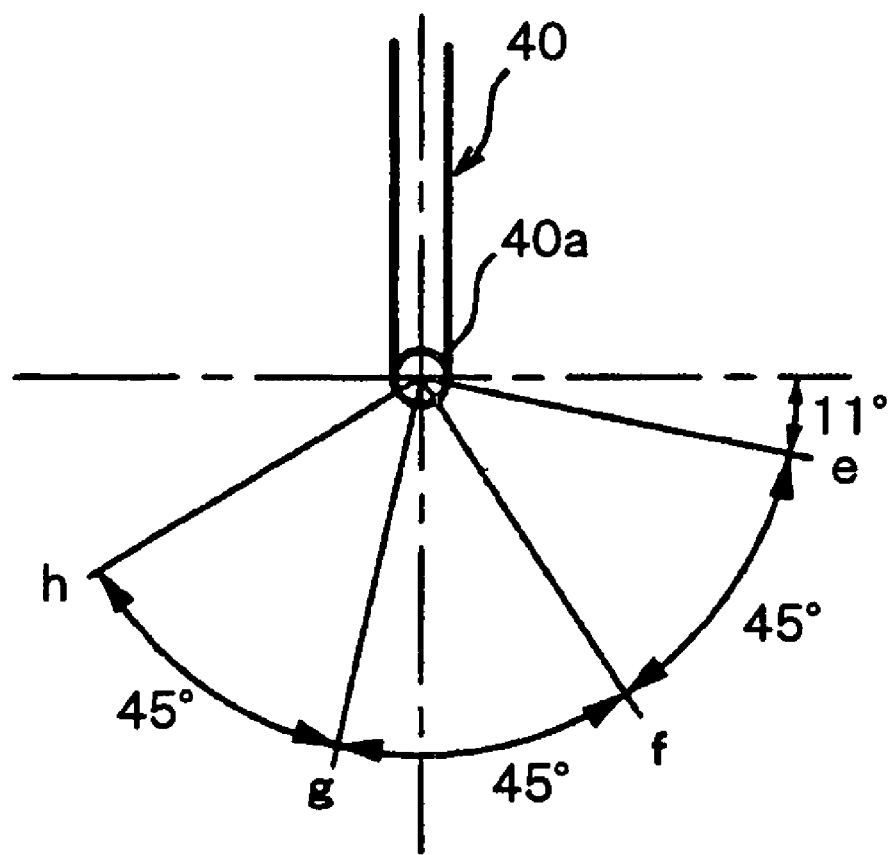
FIG. 11 is a cross-sectional view in the direction of Z-Z in FIG. 9.

In a liquid reducing agent injection nozzle 40 according to this embodiment, a plurality of nozzle holes 41 to be provided around a nozzle tip end portion 40a which is bent substantially perpendicularly along the exhaust flow direction, similarly to the embodiment shown in FIG. 6, is aligned on a plurality of lines, for example, two lines, the plurality of lines being arranged side by side in an axial direction of the nozzle tip end portion 40a as shown in FIG. 9, and is arranged that nozzle hole positions thereof on the adjacent lines are shifted from each other in the circumferential direction as shown in FIGS. 10 and 11. FIG. 10 is a cross-sectional view in the direction of Y-Y in FIG. 9, and FIG. 11 is a cross-sectional view in the direction of Z-Z in FIG. 9. In FIGS. 10 and 11, symbols a through h designate positions where the nozzle holes 41 are formed on each line as similarly shown in FIG. 7, and the reference numerals indicate spaces or intervals (angles) between the nozzle holes 41.

Figure 12:
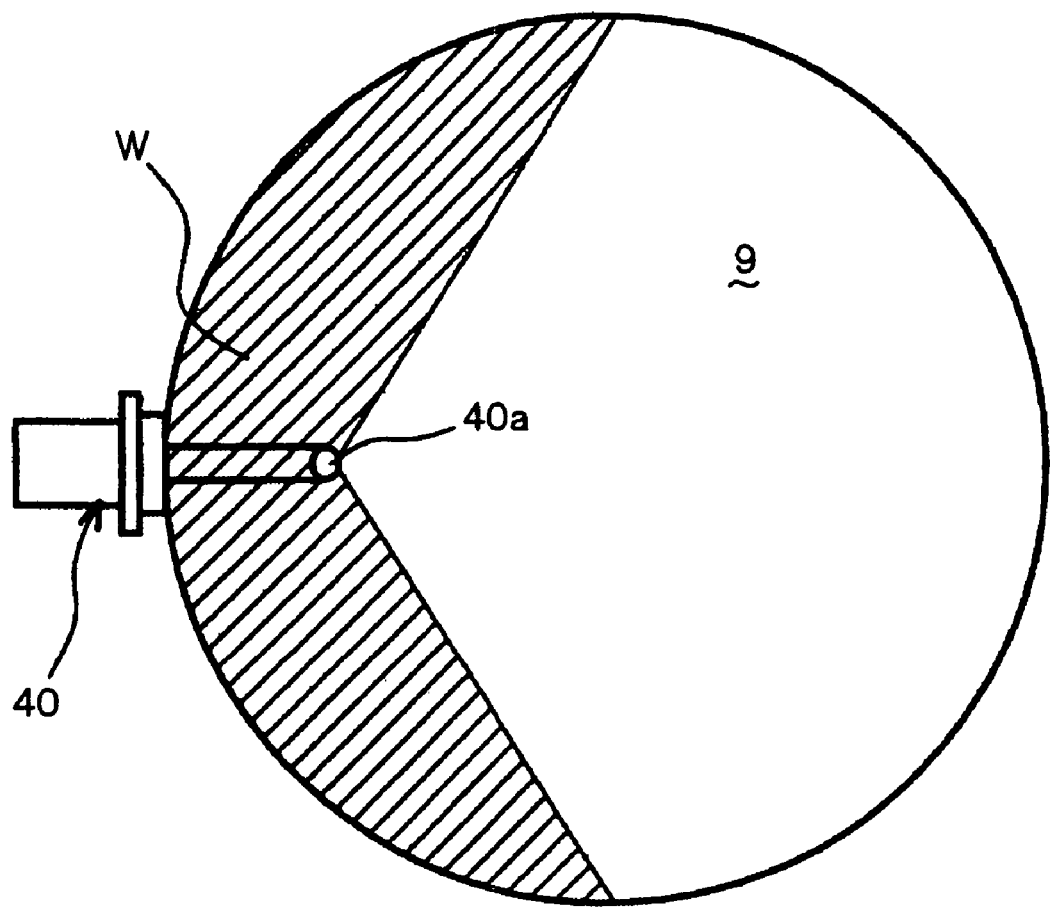
FIG. 12 is an explanatory diagrammatic view illustrating the adhesion suppressing region according to the embodiment shown in FIG. 9.

In the liquid reducing agent injection nozzle 40 having such an aforementioned structure, when viewed from a cross-sectional direction of the upstream side exhaust flow passage 9, as shown in FIG. 12, the amount of the liquid reducing agent to be adhered to the wall surface can be reduced greatly on a range W indicated by a shaded area in FIG. 12 at which the nozzle attaching portion on the wall surface on the nozzle attaching side is included as a substantially center position thereof, and the accumulation of urea or the like can be suppressed on the range W which is wider than the case of the first embodiment of the third invention shown in FIG. 6. When the nozzle holes 41 are formed to be aligned on a plurality of lines in the axial direction of the nozzle tip end portion 40a, the spaces between the nozzle holes 41 on each line can be widened. When the positions of the nozzle holes on the adjacent lines are shifted from each other in the circumferential direction, a distance between the lines in the axial direction of the nozzle tip end portion 40a can be shortened, thereby narrowing the space between the lines.

The structure of the liquid reducing agent injection nozzle 12 of the first invention shown in FIG. 3 may be combined with at least one of the following structure: the structure of the second invention shown in FIG. 4 in which the nozzle holes are formed obliquely; the structure according to the first embodiment of the third invention shown in FIG. 6 in which the nozzle holes are unevenly distributed in the circumferential direction; and the structure according to the second embodiment of the third invention shown in FIG. 9 in which the nozzle holes are formed to be aligned on a plurality of lines. As a result, the accumulation of the reducing agent component of urea or the like in the liquid reducing agent onto the wall surface can be suppressed further.

The liquid reducing agent injection nozzle 20 of the second invention shown in FIG. 4 may be combined with at least one of the following structure: the structure according to the first embodiment of the third invention in which the nozzle holes are unevenly distributed in the circumferential direction; and the structure according to the second embodiment of the third invention in which the nozzle holes are formed to be aligned on a plurality of lines.

The above embodiments have explained an example in which the present invention is applied to the muffling device with the exhaust purifying function. However, it goes without saying that the present invention can be applied not only to the muffling device with the exhaust purifying function but also to other purifying devices.

According to the present invention, in an exhaust emission purifying system which injects and supplies the liquid reducing agent into the exhaust passage so as to reduce the NOx emission amount, the accumulation of the reducing agent component of the liquid reducing agent on the wall surface of the exhaust flow passage can be suppressed, thereby widening the industrial applicability.

It should be appreciated that the entire contents of Japanese Patent Application No. 2004-315634, filed on Oct. 29, 2004, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

I claim:

1. A liquid reducing agent injection nozzle having a novel structure, and provided with such a configuration that the liquid reducing agent injection nozzle is:

attached to a wall surface of an exhaust flow passage of an exhaust gas located on an upstream of a reduction catalyst in the exhaust flow passage, the reduction catalyst being operative to reduce and purify a nitrogen oxide using a liquid reducing agent and disposed in the exhaust flow passage;

arranged to protrude from the wall surface towards a passage center to a position close to but before the passage center; and configured to permit the liquid reducing agent to be spouted and supplied from a number of nozzle holes formed therein around a nozzle tip end portion thereof, the nozzle tip end portion being bent to have a posture thereof which is directed substantially toward a direction of flow of the exhaust gas, wherein the bent nozzle tip end portion of the liquid reducing agent injection nozzle is arranged to have a central axis thereof directed towards the passage center and defining an angle of bend which is oblique to the flow of exhaust gas in the exhaust flow passage, and wherein the number of nozzle holes of the nozzle tip end portion are unevenly distributed in a circumferential direction of the nozzle tip end portion excluding a surrounding area which faces the wall surface on the nozzle attaching side of the bent nozzle tip end portion, so that the liquid reducing agent is not spouted to a wall surface portion of the exhaust flow passage including a predetermined range that includes a nozzle attaching portion of the wall surface on the nozzle attaching side as a substantially center position thereof, and the liquid reducing agent is spouted to a wall surface portion of the exhaust flow passage excluding the predetermined range, viewing from a cross-sectional direction of the exhaust flow passage.

2. The liquid reducing agent injection nozzle according to claim 1, wherein the nozzle holes of the nozzle tip end portion are formed to be tilted in the exhaust flow direction with respect to a radial direction perpendicular to the center axis of the nozzle tip end portion.

3. The liquid reducing agent injection nozzle according to claim 1, wherein
the nozzle holes are formed to be aligned on each of a plurality of lines arranged side by side in an axial direction of the nozzle tip end portion, and
positions of the nozzle holes on the adjacent lines are shifted from each other in a circumferential direction.

4. The liquid reducing agent injection nozzle according to claim 1, wherein the liquid reducing agent injection nozzle is applied to a liquid reducing agent injection nozzle of a muffling device with an exhaust purifying function, the muffling device comprising a constitution such that:
an exhaust flow passage provided in the muffling is provided with a returning portion;
the liquid reducing agent injection nozzle is arranged in the exhaust flow passage on an upstream side of the returning portion; and
the reduction catalyst is arranged in the exhaust flow passage on a downstream side of the returning portion.

5. A liquid reducing agent injection nozzle having a novel structure, and provided with such a configuration that the liquid reducing agent injection nozzle is:
attached to a wall surface of an exhaust flow passage of an exhaust gas located on an upstream of a reduction catalyst in the exhaust flow passage, the reduction catalyst being operative to reduce and purify a nitrogen oxide using a liquid reducing agent and disposed in the exhaust flow passage;
arranged to protrude from the wall surface towards a passage center to a position close to but before the passage center; and
configured to permit the liquid reducing agent to be spouted and supplied from a number of nozzle holes formed therein around a nozzle tip end portion thereof, the nozzle tip end portion being bent to have a posture thereof which is directed substantially toward a direction of flow of the exhaust gas,
wherein the nozzle holes of the nozzle tip end portion are formed to be tilted in the exhaust flow direction with respect to a radial direction perpendicular to the center axis of the nozzle tip end portion, and
wherein the number of nozzle holes of the nozzle tip end portion are unevenly distributed in a circumferential direction of the nozzle tip end portion excluding a surrounding area which faces the wall surface on the nozzle attaching side of the bent nozzle tip end portion, so that the liquid reducing agent is not spouted to a wall surface portion of the exhaust flow passage including a predetermined range that includes a nozzle attaching portion of the wall surface on the nozzle attaching side as a substantially center position thereof, and the liquid reducing agent is spouted to a wall surface portion of the exhaust flow passage excluding the predetermined range, viewing from a cross-sectional direction of the exhaust flow passage.

6. The liquid reducing agent injection nozzle according to claim 5, wherein
the nozzle holes are formed to be aligned on each of a plurality of lines arranged side by side in an axial direction of the nozzle tip end portion, and
positions of the nozzle holes on the adjacent lines are shifted from each other in a circumferential direction.

7. The liquid reducing agent injection nozzle according to claim 5, wherein the liquid reducing agent injection nozzle is applied to a liquid reducing agent injection nozzle of a muffling device with an exhaust purifying function, the muffling device comprising a constitution such that:
an exhaust flow passage provided in the muffling is provided with a returning portion;
the liquid reducing agent injection nozzle is arranged in the exhaust flow passage on an upstream side of the returning portion; and
the reduction catalyst is arranged in the exhaust flow passage on a downstream side of the returning portion.

8. A liquid reducing agent injection nozzle having a novel structure, and provided with such a configuration that the liquid reducing agent injection nozzle is:
attached to a wall surface of an exhaust flow passage of an exhaust gas located on an upstream of a reduction catalyst in the exhaust flow passage, the reduction catalyst being operative to reduce and purify a nitrogen oxide using a liquid reducing agent and disposed in the exhaust flow passage;
arranged to protrude from the wall surface towards a passage center to a position close to but before the passage center; and
configured to permit the liquid reducing agent to be spouted and supplied from a number of nozzle holes formed therein around a nozzle tip end portion thereof, the nozzle tip end portion being bent to have a posture thereof which is directed substantially toward a direction of flow of the exhaust gas,
wherein the number of nozzle holes of the nozzle tip end portion are unevenly distributed in a circumferential direction of the nozzle tip end portion excluding a surrounding area which faces the wall surface on the nozzle attaching side of the bent nozzle tip end portion, so that the liquid reducing agent is not spouted to a wall surface portion of the exhaust flow passage including a predetermined range that includes a nozzle attaching portion of the wall surface on the nozzle attaching side as a substantially center position thereof, and the liquid reducing agent is spouted to a wall surface portion of the exhaust flow passage excluding the predetermined range, viewing from a cross-sectional direction of the exhaust flow passage.

9. The liquid reducing agent injection nozzle according to claim 8, wherein the nozzle holes are formed to be aligned on each of a plurality of lines arranged side by side in an axial direction of the nozzle tip end portion, and positions of the nozzle holes on the adjacent lines are shifted from each other in a circumferential direction.

10. The liquid reducing agent injection nozzle according to claim 9, wherein the liquid reducing agent injection nozzle is applied to a liquid reducing agent injection nozzle of a muffling device with an exhaust purifying function, the muffling device comprising a constitution such that:

an exhaust flow passage provided in the muffling is provided with a returning portion;

the liquid reducing agent injection nozzle is arranged in the exhaust flow passage on an upstream side of the returning portion; and the reduction catalyst is arranged in the exhaust flow passage on a downstream side of the returning portion.

* * * * *